United States Patent [19]
Heitmann

[11] Patent Number: 5,032,933
[45] Date of Patent: Jul. 16, 1991

[54] MAGNETIC TAPE RECORDING AND PLAYBACK EQUIPMENT FOR AUTOMATIC CHECK OF RECORDED DATA

[75] Inventor: Jürgen Heitmann, Alsbach-Hahnlein, Fed. Rep. of Germany

[73] Assignee: BTS Broadcast Television Systems GmbH, Darmstadt, Fed. Rep. of Germany

[21] Appl. No.: 390,614

[22] Filed: Aug. 7, 1989

[30] Foreign Application Priority Data

Aug. 29, 1988 [DE] Fed. Rep. of Germany ....... 3829182

[51] Int. Cl.$^5$ .............................................. G11B 15/14
[52] U.S. Cl. .................................................. 360/64
[58] Field of Search ........................ 360/64, 62, 61, 53

[56] References Cited

U.S. PATENT DOCUMENTS 4,887,171  12/1989  Rose ........................................ 360/64
4,930,025  5/1990  Oberjatzas et al. ..................... 360/64

FOREIGN PATENT DOCUMENTS 2191327  12/1987  United Kingdom .

OTHER PUBLICATIONS

"Standard for Recording Digital Television Signals on Magnetic Tapes and Cassettes", EBU, Tech. 3252-E.
"Fernseh-und Kinotechnik", 1987, Issue 1/2, pp. 15-22.

Primary Examiner—Vincent P. Canney
Attorney, Agent, or Firm—Frishauf, Holtz, Goodman & Woodward

[57] ABSTRACT

A rotary scanning device of a magnetic tape recording and playback equipment, which carries a set of recording heads and a set of playback heads on its periphery is provided with one rotary transformer in addition to the number equal to the number of recording heads and to the number of playback heads of said sets. The additional rotary transformer is used for cyclically connecting its rotor to the respective playback heads during a recording operation by means of a controlled transfer switch, so that a fraction of the signals recorded by each of the recording heads is made available for an after-check which can be performed without visual display because of the digital nature of the recorded signals, which are evaluated by error recognition and word count circuits.

6 Claims, 2 Drawing Sheets

MAGNETIC TAPE RECORDING AND PLAYBACK EQUIPMENT FOR AUTOMATIC CHECK OF RECORDED DATA

FIELD OF THE INVENTION

This invention concerns magnetic tape recording and playback equipment having a rotary body for scanning the tape, around which the tape is looped helically, recording heads for playback and recording being provided around the circumference of the rotary body and rotary transformers being used, each having a rotor on the rotary body and a stator in a fixed position. In such equipment switching stages are provided for allocating the rotors of the rotary transformers to the respective magnetic heads.

BACKGROUND

Such a tape equipment is known from British Patent 2,191,327. In these known magnetic tape equipments controlled switching stages are provided in the rotary body of a tape scanning device for connecting and disconnecting the rotor windings of rotary transformers to recording heads and playback heads located on the periphery of the rotary body. In this device, in order to provide an after-check of what has just been recorded, it is necessary to have twice as many rotary transformers as are needed merely for recording and playback.

SUMMARY OF THE INVENTION

It is an object of the present invention to provide magnetic tape equipment of the above-mentioned kind in which during the recording operation the data signals written onto the magnetic tape by the recording heads can be read from the tape by playback heads as an after-check of the recording without requiring that the number of rotary transformers should be doubled.

Briefly, only one additional rotary transformer is used. One of the rotary transformers is permanently assigned to one of the recording heads while three others are switched between respective recording and respective corresponding playback heads. The fifth rotary transformer is switched cyclically to all four playback heads during an after-check operation during recording, but is allocated to one of them only during playback. This arrangement has the advantage of minimizing the number of rotary transformers needed for the after-check. It is based on the recognition that it is not absolutely necessary to check all of the data recorded on the recorder tracks for an after-check of digital video data.

It has also been found particularly advantageous to provide a comparison of delayed recording data with data played back in order to determine whether a recording has been performed without error. Furthermore, during the recording operation a check can be made whether individual transformer paths are operating properly by an E-E (electronic-to-electronic) operation.

BRIEF DESCRIPTION OF THE DRAWINGS

The invention is further described by way of illustrative example with reference to the annexed drawings in which.

BRIEF DESCRIPTION OF THE ILLUSTRATED EMBODIMENT

Figure 1:
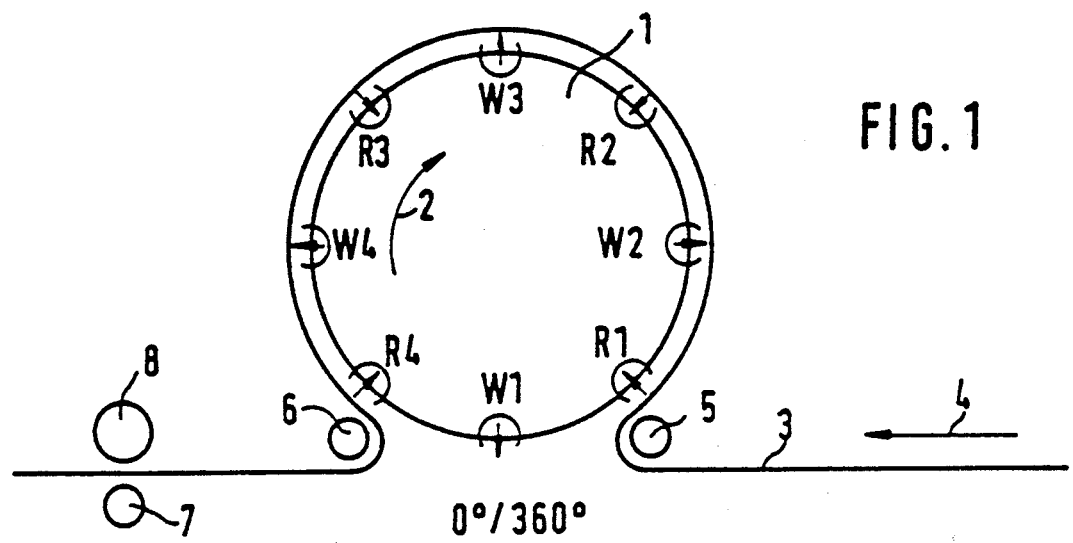
FIG. 1 is schematic representation of a rotary scanning device for magnetic tape.

FIG. 1 shows a rotary body 1 which revolves in the direction shown by the arrow 2. The rotary body can for example be a rotating head wheel or a rotating drum. The rotary body 1 has a tape 3 looped helically around it over an angular region of about 270°, so that tracks running obliquely to the tape edge can be scanned. Guiding elements 5 and 6 serve to deflect the tape arriving in the direction 4. The advance of the tape 3 is produced by a drive shaft 7 cooperating with a rubber pressure roller 8.

Recording or write magnetic heads W1, W2, W3 and W4 are affixed to the circumference of the rotary body 1 and are spaced from one to the next by 90°.

Playback heads R1, R2, R3 and R4 respectively follow the recording heads W1, W2, W3, W4 in the direction of rotation of the arrow 2. The playback heads are set in track height relative to the recording heads in such a manner that they can scan the tracks written into by the respectively preceding recording heads.

Figure 2:
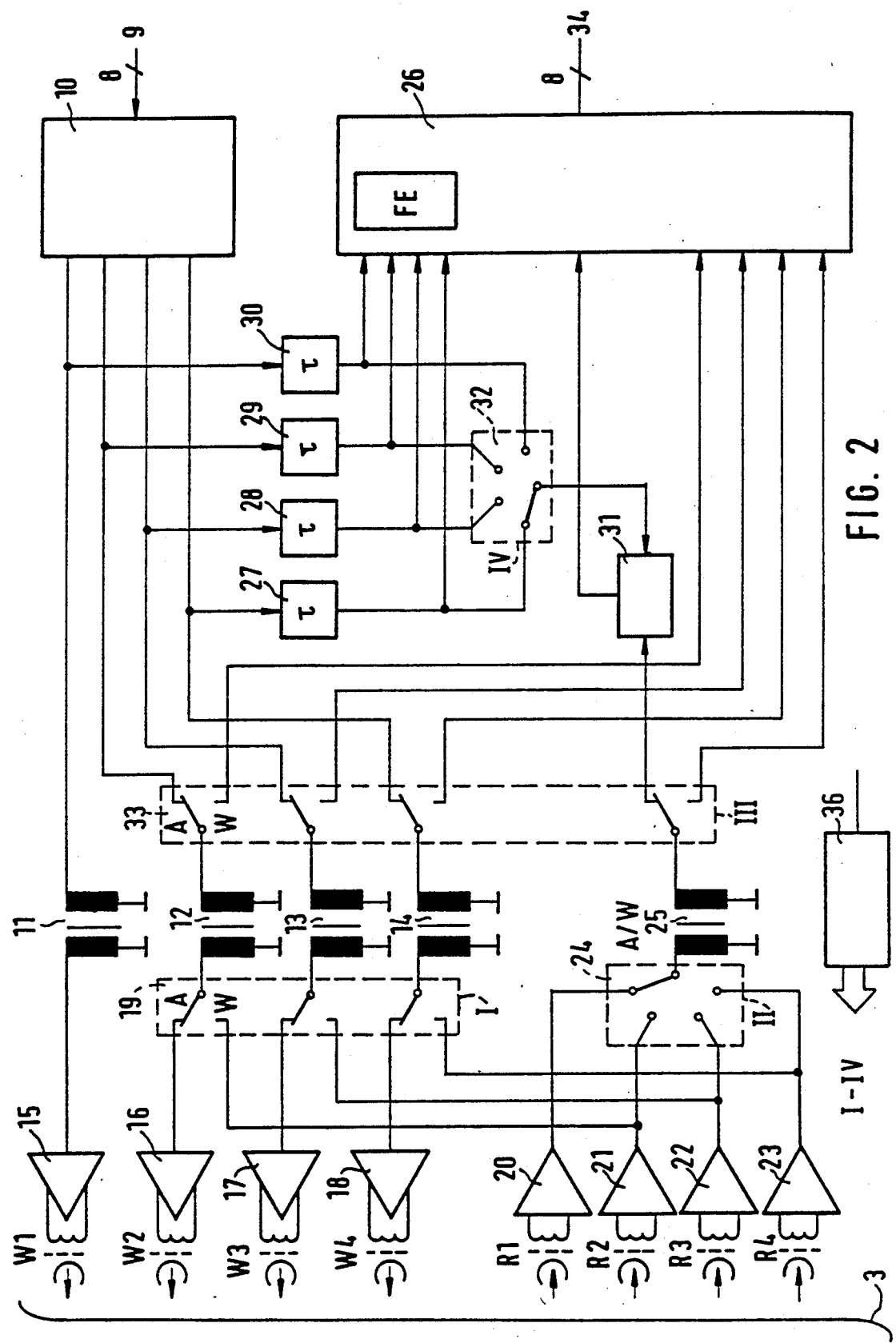
FIG. 2 is a block circuit diagram of an embodiment of the invention.

In the block circuit diagram of FIG. 2 parts that are the same as those appearing in FIG. 1 are identified by the same reference numerals. At 9 an eight-bit parallel data signal is supplied to a digital processor 10, where it is prepared for transmission, put into serial form and supplied to the respective transformer paths of rotary transformers 11, 12, 13 and 14. Details of the digital processor 10 are given, for example, in the publication "Standard for Recording Digital Television Signals on Magnetic Tapes, and Cassettes" of the European Broadcast Union, TECH 3252-E and in the periodical "Fernsehund Kinotechnik", 1987, Issue 1/2, pp. 15-22.

The rotary transformers 11 to 14 each consist of a rotor and a stator. The rotors of the rotary transformers 11, 12, 13, 14 rotate with the rotary body 1. The rotor of the rotary transformer 11 is directly connected to a recording amplifier 15 which is in turn connected to the recording head W1. The signal supply of the rotors of the rotary transformers 12, 13 and 14 to the recording amplifiers 16, 17 and 18, which are connected to the recording magnetic heads W2, W3 and W4, goes through transfer switches 19 and 33 which are controlled in parallel.

On the playback side, the signals read out from the magnetic tape 3 by the playback magnetic head R1, R2, R3 and R4 are preamplified by the amplifiers 20, 21, 22 and 23 and then further connected to another controlled transfer switch 24 to the rotor of a rotary transformer 25. Along with the already mentioned rotor windings of the rotary transformers 11, 12, 13, 14 and 25 and the already mentioned recording heads W1, W2, W3, W4 and playback heads R1, R2, R3, R4 there are also located on the rotary body the recording amplifiers 15, 16, 17 and 18, the playback preamplifiers 20, 21, 22, 23 and the controlled switches 19 and 24.

In the switch positions of the controlled switches 33, 19 and 24 (shown in FIG. 3), the illustrated equipment operates in a recording mode. The serial data of the four signal paths respectively passing through the rotary transformers 11, 12, 13, 14 are then supplied to the recording heads W1, W2, W3 and W4. During the recording operation, the playback heads R1, R2, R3 and R4 take over the checking of the data that have just been recorded, in an after-check operation. Immediately after it is recorded, each recorded track is read by one of the playback heads R1, R2, R3 and R4.

For a complete checking, each playback magnetic head would have to be connected to a separate rotary transformer, so that the operation would have to proceed in the presence of eight rotary transformers. In contrast to an analog magnetic tape equipment, however, digital recording has the advantage that the after-check of recording can be automated. In a case of video signals recorded in analog fashion, the quality of the video signal is visually evaluated by the after-check. This subjective evaluation can be replaced in the case of digitally recorded video signals by an objective evaluation in which the number of errors which occur in the reading of a track are counted. The counting is performed in a digital playback processor 26 with error protection evaluation stages of a known kind provided therein. Details regarding such a processor are to be found in the publications identified above. The number of errors counted is a direct measure for the picture quality.

The invention is based on the recognition that an objective counting procedure no longer needs to be carried out at the same time for the full number of tracks determined by the number of recording heads, as would be required for analog recording. On the contrary, it is sufficient to count the number of errors of the track of the recording head W1 for a first time interval, then, during a second time interval, to count the errors of the track of the recording head W2, and during a third time interval the errors of the track of the recording head W3 and finally in a fourth time interval the errors of the track of the recording head W4. The error evaluation can thus proceed sequentially.

In the illustrated embodiment four playback heads R1, R2, R3, R4 are allocated in four respective time intervals T1 to T4 to only a single rotary transformer 25. Thus only five rotary transformers are needed: four transformers 11, 12, 13 and 14 for the recording heads W1, W2, W3, W4 and a rotary transformer 25 needed during a recording operation for the four playback heads R1, R2, R3, R4. Only one quarter of the data of the recorded video signals can be obtained in this way, however, at the output of the rotary transformer 25, in a sequential manner, from the four playback heads R1, R2, R3 and R4. This quarter portion which corresponds to a genuine after-check is completed by three quarters of a so-called E-E video signal check and put together to produce a complete data signal which is supplied to the digital playback processor 26, which in a known way examines the data for errors by means of built-in error protection circuits.

In the case of the recording of data of a video signal, playback errors can also be made visible in pictures produced by an after-check signal. Only one quarter of the errors that could be read by a playback head are visible.

In the case of an alternative for recording formats without error protection in the processor 26, the after-check signal obtained from playback heads R1, R2, R3, R4 are compared in a digital comparator 31 with a delayed data signal obtained from the recording heads W1, W2, W3, W4. The correlation of the delayed data signals of the comparator 31 is performed by a controlled transfer switch 32. The errors detected by the comparison are counted in the digital playback processor 26.

In addition, in the playback processor 26 the delayed data signals are monitored in the error recognition units FE for the E-E mode of operation. Thus for example the delayed data signals are supplied to the error recognition portion FE of the digital playback processor 26.

Figure 3:
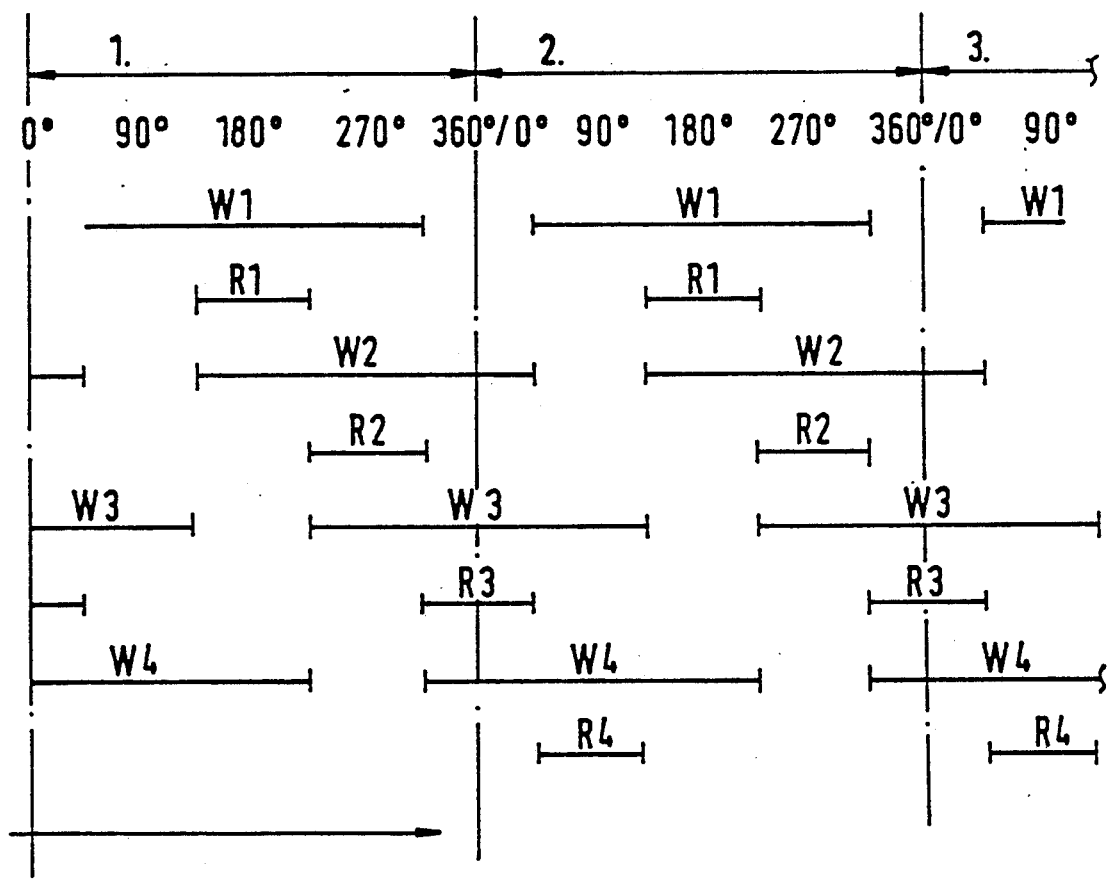
FIG. 3 is a timing diagram showing the periods during which the various heads are in use for explanation of the operation of the embodiment of FIG. 2.

The control of the controllable switches 19, 24, 32 and 33 is performed by a control unit 36 in which, according to the operation mode that may be selected (record, playback...) or according to the concurrent phase of rotation of the rotary body 1, the necessary control signals I, II, III and IV specified in FIG. 3 are derived by logical correlation. In playback operation, the switches of the switching stages 19, 24 and 32 are put into the position W (playback), in which the rotary transformers 12, 13 and 14, which were previously used for recording, are now used in playback. The playback magnetic head R1 is in this operation connected to the rotary transformer 25, because the rotary transformer 11 is permanently assigned to the recording head W1. At the output 34 shown in FIG. 2 a complete video signal is made available in eight-bit parallel form.

FIG. 3 shows for about two and one-half revolutions of the rotary body 1, the time intervals of head-to-tape contact of the respective recording heads W1, W2, W3 and W4 in terms of angle of rotation. If it is assumed that the position of the rotary body 1 shown in FIG. 1 corresponds to an angular position 0, the recording head W1 slips into the loop of the tape 3 after 45 and leaves the magnetic tape after 315. With a corresponding time offset the recording heads W2, W3 and W4 follow the head W1. The playback magnetic heads which respectively follow the correspondingly numbered recording heads follow at a certain time offset. The furnishing of the respective signals of the individual playback heads R1, R2, R3 and R4 through the controlled switch 24 to the rotary transformer 25 takes place, in each case, only in one quarter of the time which the preceding recording head requires for scanning a track.

In a variant (not represented in the drawings) of the above-described embodiment of the invention, the following playback head can also read the entire length of a recorded track. This following playback head is then brought into play on a full-track basis for after-check. This would mean that the signal switching of the after-check signals produced by the playback magnetic heads R1, R2, R3 and R4 would take place cyclically track-wise.

It will therefore be seen that although the invention has been described with reference to a particular illustrative example, variations and modifications are possible without departing from the scope of the invention.

I claim:

1. A magnetic tape equipment for recording and playback of data signals having a rotary body, around which a magnetic tape is helically looped, on which body playback and recording magnetic heads are distributed around the periphery of said body, rotary transformers being provided in said equipment, each having a rotor on said rotary body and a stator in fixed position, switching means mounted on said rotary body being interposed between magnetic heads and said rotors of said rotary transformers, and wherein:

said recording heads are n in number, said playback heads are n in number, and said rotary transformers are n +1 in number, wherein during recording of data signals said n heads are connected either directly or through said switching means or respectively to n of said n+1 of said rotary transformers, while or after check of said data signals, one of said n+1 rotary transformers which is not connected to any of said recording heads is cyclically switched in a fixed sequence to said n playback heads, and wherein during playback operation said n playback heads are connected to n of said n+1 rotors of respective rotary transformers.

2. The magnetic tape equipment of claim 1, in which n=4, and wherein a first rotary transformer (11) has its rotor permanently connected to a first recording head (W1) and wherein said rotor of said rotary transformer (25) which is not connected to any recording head during a recording mode of operation is among the rotors of rotary transformers respectively connected to playback heads during a playback operation.

3. The magnetic tape equipment of claim 2, wherein a comparator (31) is provided for comparing, during a recording mode of operation of said equipment, the data signal read by one of said playback heads with a delayed data signal from a corresponding recording head which is the nearest recording head to precede said one playback head in the direction of rotation of said rotary body and wherein a controllable transfer switch is provided for supplying said delayed video signal to said comparator and delay means are interposed between connectable terminals of said transfer switch and respective stators of said rotary transformers which are the four rotary transformers respectively connected or connectable to said recording heads for making available the delayed recording signals of said comparator.

4. The magnetic tape equipment of claim 3, wherein during operation in a recording mode, each of the said playback heads is connected to said comparator (31) during one quarter of the time in which the respective playback head is in contact with the magnetic tape.

5. The magnetic tape equipment of claim 4, wherein said switching means (24) for cyclically connecting the four playback heads with a single rotor of a rotary transformer (25) is controlled in a manner dependent upon the rotary phase position of said rotary body (1).

6. The magnetic tape equipment of claim 1, wherein four delay circuits are provided respectively delaying signals being recorded by the respective recording heads and having an output for delayed recording signals, wherein a playback processor (26) is provided having capability for E-E operation for error recognition having inputs respectively connected to said outputs of said respective delay circuits, and wherein said delayed data signals from said delay circuits are utilized for evaluation of said playback processor in an E-E operation.

* * * * *